US007302229B2

(12) United States Patent
Riddles (10) Patent No.: US 7,302,229 B2
(45) Date of Patent: Nov. 27, 2007

(54) ENABLING DESIRED WIRELESS CONNECTIVITY IN A HIGH FREQUENCY WIRELESS LOCAL AREA NETWORK

(75) Inventor: Philip John Riddles, East Sussex (GB)

(73) Assignee: Lucent Technologies Inc., Murray Hill, NJ (US)

( * ) Notice: Subject to any disclaimer, the term of this patent is extended or adjusted under 35 U.S.C. 154(b) by 384 days.

(21) Appl. No.: 11/126,759

(22) Filed: May 11, 2005

(65) Prior Publication Data

US 2006/0258285 A1 Nov. 16, 2006

(51) Int. Cl.
*H04B 7/00* (2006.01)
(52) U.S. Cl. .................. 455/41.2; 455/557; 455/556.2; 455/445; 370/338; 370/392; 370/401; 709/217; 709/219; 709/227; 340/870.02; 340/870.11
(58) Field of Classification Search ............... 455/41.2, 455/557, 556.2, 445; 370/338, 392, 401; 340/870.02, 870.11
See application file for complete search history.

(56) References Cited

U.S. PATENT DOCUMENTS

| | | | | |
|---|---|---|---|---|
| 6,236,358 | B1 * | 5/2001 | Durst et al. ............ | 342/357.09 |
| 6,246,688 | B1 * | 6/2001 | Angwin et al. ............ | 370/401 |
| 6,370,396 | B1 * | 4/2002 | Meiksin et al. ............ | 455/560 |
| 7,002,943 | B2 * | 2/2006 | Bhagwat et al. ............ | 370/338 |
| 7,136,655 | B2 * | 11/2006 | Skafidas et al. ............ | 455/450 |
| 7,138,914 | B2 * | 11/2006 | Culpepper et al. ..... | 340/539.13 |
| 7,216,365 | B2 * | 5/2007 | Bhagwat et al. ............... | 726/23 |
| 7,245,913 | B1 * | 7/2007 | Nguyen et al. .......... | 455/435.2 |

OTHER PUBLICATIONS

"Cisco Aironet 1200 Series Access Point" —Cisco Systems, Inc., 1992-2004.
"Key RADIUS/AAA Considerations for Hotspot Operators" — Funk Software, Inc., Jun. 2004.

* cited by examiner

*Primary Examiner*—Marceau Milord (57) ABSTRACT

The present invention provides a method and an apparatus to enable desired wireless connectivity in a high frequency and/or high speed wireless local area network for providing mobile communications to a user of a wireless communication device which may be otherwise unable to connect to the high frequency and/or speed wireless local area network in response to a request for a wireless service. By using a chipset disposed in another wireless communication device, a neural network may be formed for enabling such wireless connectivity. In one embodiment, availability of wireless connectivity may be determined to a first user of a wireless service at a first wireless communication device to communicate with an access point associated with a Wi-Fi wireless network that offers the wireless service. Absent such wireless connectivity at the first wireless communication device, additional bandwidth available at a second wireless communication device may be used to connect the first user at the first wireless communication device over another network that offers the wireless service, for example, a wide area network capable of communicating mobile or cellular data. Accordingly, a user that desires use of a wireless service in a wireless network of sparsely populated Wi-Fi access points may obtain desired wireless connectivity for mobile communications across a relatively longer range and/or at much higher transfer speeds than otherwise available.

20 Claims, 6 Drawing Sheets

ENABLING DESIRED WIRELESS CONNECTIVITY IN A HIGH FREQUENCY WIRELESS LOCAL AREA NETWORK

FIELD OF THE INVENTION

This invention relates generally to telecommunications, and more particularly, to wireless communications.

DESCRIPTION OF THE RELATED ART

Increasingly, a large number of people on the move for business or personal reasons desire wireless access to operate all types of user applications generally available only at home or in the office. To offer a longer range or greater transfer speeds for wireless communications, Institute of Electrical and Electronics Engineers (IEEE) has specified a set of standards for wireless local area networks (WLAN) including IEEE 802.11b or Wireless Fidelity (Wi-Fi) standard. The term "Wi-Fi" is promulgated by Wireless Ethernet Compatibility Alliance (WECA) as a trade name for the IEEE 802.11b standard.

Over a Wi-Fi network, Wi-Fi enabled devices from different manufacturers may cooperatively operate with each other. For example, a Wi-Fi enabled device user may communicate with an Access Point (AP) that is consistent with the Wi-Fi standard. Many wireless service providers deliver mobile high-speed data services to users of wireless communication-enabled devices, such as Wi-Fi equipped users. Accordingly, a variety of wireless networks are deployed to transport data traffic generated by Wi-Fi hotspots, providing business users and consumers with secure, high-speed and convenient access to the Internet and client applications from any kind of Wi-Fi enabled device in different mobile environments, such as trains and transport vehicles including buses and passenger cars.

More specifically, a Wi-Fi network is a high-frequency wireless local area network (WLAN) used as an alternative to a wired LAN of a business or a home, as examples. The Wi-Fi network is often limited to a short wireless range of few hundred feet, e.g., 300 feet, to provide a small coverage area. In this manner, to a user of a Wi-Fi enabled device, such as a cell phone, a Wi-Fi network may enable a relatively high-speed wireless data or media service at airports and hotels, for example. Accordingly, online or Internet content may be made readily accessible to processor-based wireless communications devices including cellular, mobile, wireless or satellite phones, laptop computers, and portable or handheld devices including personal digital assistants (PDAs) and global positioning systems (GPSs).

Presence of a Wi-Fi network access point is desired to provide a wireless service, for example, to check e-mail, communicate via instant messaging (IM) and/or browse the Internet. However, enough Wi-Fi network access points may not be available for a user to avail such a wireless service over a relatively large coverage area. Accordingly, sparsely populated Wi-Fi network access points for wireless communications may be a limiting factor for a user that desires to avail a wireless service across a relatively longer range or at much higher transfer speeds.

Other types of wireless connections, such as one based on the third generation (3G) midband mobile communication networks may provide only about half the speed of a Wi-Fi public service, however, may cost many times more than the cost of a broadband connection from a public hotspot. As a result, a wireless connection cannot be established with desired metrics for a user to avail a wireless service, for example, to check e-mail, communication via instant messaging (IM) and/or browse the Internet. That is, such a wireless connection could be established, though at the expense of speed and cost.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided to enable wireless connectivity in a high frequency wireless local area network. The method comprises determining whether wireless connectivity is available to a first user of a wireless service at a first wireless communication-enabled device to communicate with an access point associated with the high frequency wireless local area network that offers the wireless service, and if the wireless connectivity is unavailable, using additional bandwidth available at a second wireless communication-enabled device to connect the first user over another network that offers the wireless service.

In another embodiment, a method of enabling desired wireless connectivity provides mobile communications on a non-requested connection. The method comprises enabling wireless connectivity for a first wireless communication-enabled device at a second wireless communication-enabled device based on a Wi-Fi neural network to connect a first user of a wireless service at the first wireless communication-enabled device to a network that offers the wireless service.

In yet another embodiment, a chipset enables desired wireless connectivity in a high frequency wireless local area network for providing mobile communications. The chipset comprises an integrated circuit that provides wireless connectivity for a first processor-based, wireless communication-enabled device, wherein the chipset is disposed at a second processor-based, wireless communication-enabled device to form a neural network for the high frequency wireless local area network to connect a first user of a wireless service at the first processor-based, wireless communication-enabled device to a network different than the high frequency wireless local area network that offers the wireless service.

In still another embodiment, a communication system enables desired wireless connectivity in a high frequency wireless local area network for providing mobile communications. The communication system comprises a processor-based, wireless communication-enabled device including a chipset that provides wireless connectivity for another processor-based, wireless communication-enabled device, wherein the chipset to form a neural network for the high frequency wireless local area network to connect a user of a wireless service at the another processor-based, wireless communication-enabled device to a network different than the high frequency wireless local area network that offers the wireless service.

In one illustrative embodiment, an apparatus enables wireless connectivity in a high frequency wireless local area network. The apparatus comprises means for determining whether wireless connectivity is available to a first user of a wireless service at a first wireless communication-enabled device to communicate with an access point associated with the high frequency wireless local area network that offers the wireless service and means for using bandwidth available at a second wireless communication-enabled device to connect the first user over another network different than the high frequency wireless local area network that offers the wireless service if the wireless connectivity is unavailable.

In another exemplary embodiment, an apparatus for enabling desired wireless connectivity provides mobile communications on a non-requested connection. The apparatus comprises means for enabling wireless connectivity for a first wireless communication-enabled device at a second wireless communication-enabled device based on a Wi-Fi neural network and means for connecting a first user of a wireless service at the first wireless communication-enabled device from the second wireless communication-enabled device to a network that offers the wireless service.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided to enable desired wireless connectivity in a high frequency and/or high speed wireless local area network (WLAN for providing mobile communications to a user of a wireless communication device which may be otherwise unable to connect to the high frequency WLAN. By using a chipset disposed in another wireless communication device, a neural network may be formed for enabling such wireless connectivity. The neural network comprises a Wi-Fi chipset and a wide area network (WAN) chipset for mobile data communication, e.g., a 3G mobile data chipset. In a communication system, the chipset uses the neural network to enable the wireless connectivity that provides a wireless service to the user at the wireless communication device through a different network than the high frequency WLAN. By selectively using the Wi-Fi chipset based on whether a wireless communication enabled device connects a user to a network that offers a service on a broadband connection, in combination with a WAN chipset of another wireless communication enabled device, the chipset provides the wireless connectivity to the user. In response to a request for a wireless service from a first user, the neural network causes sharing of a predefined percentage of additional bandwidth on a backhaul connection across a plurality of mobile users outside a range of a hotspot in which an access point provides a wireless service to the plurality of mobile users through the high frequency WLAN. Besides the chipset, both the Wi-Fi and WAN chipsets may be disposed in a processor-based, wireless communication-enabled device, such as a laptop computer. Specifically, the chipset enables mobile communications for a user of a wireless communication-enabled device to gain access to the wireless service via another user's connection through another wireless communication-enabled device that may be located within a coverage area of a Wi-Fi network associated with a high frequency WLAN using a WAN network capable of communicating mobile data. To provide wireless connectivity, the chipset securely bridges the WAN capable of carrying, e.g., 3G mobile data to the Wi-Fi network while securing data transfer using a firewall. In this way, the chipset enables desired wireless connectivity using a Wi-Fi neural network for a user of a wireless service at a Wi-Fi enabled device that may be outside a range of a hotspot by connecting the user through another Wi-Fi enabled device within a coverage area over a non-requested connection to an alternate mobile communication network that offers the wireless service, i.e., email checking, online access, web browsing, and the alike on the Internet.

Figure 1:
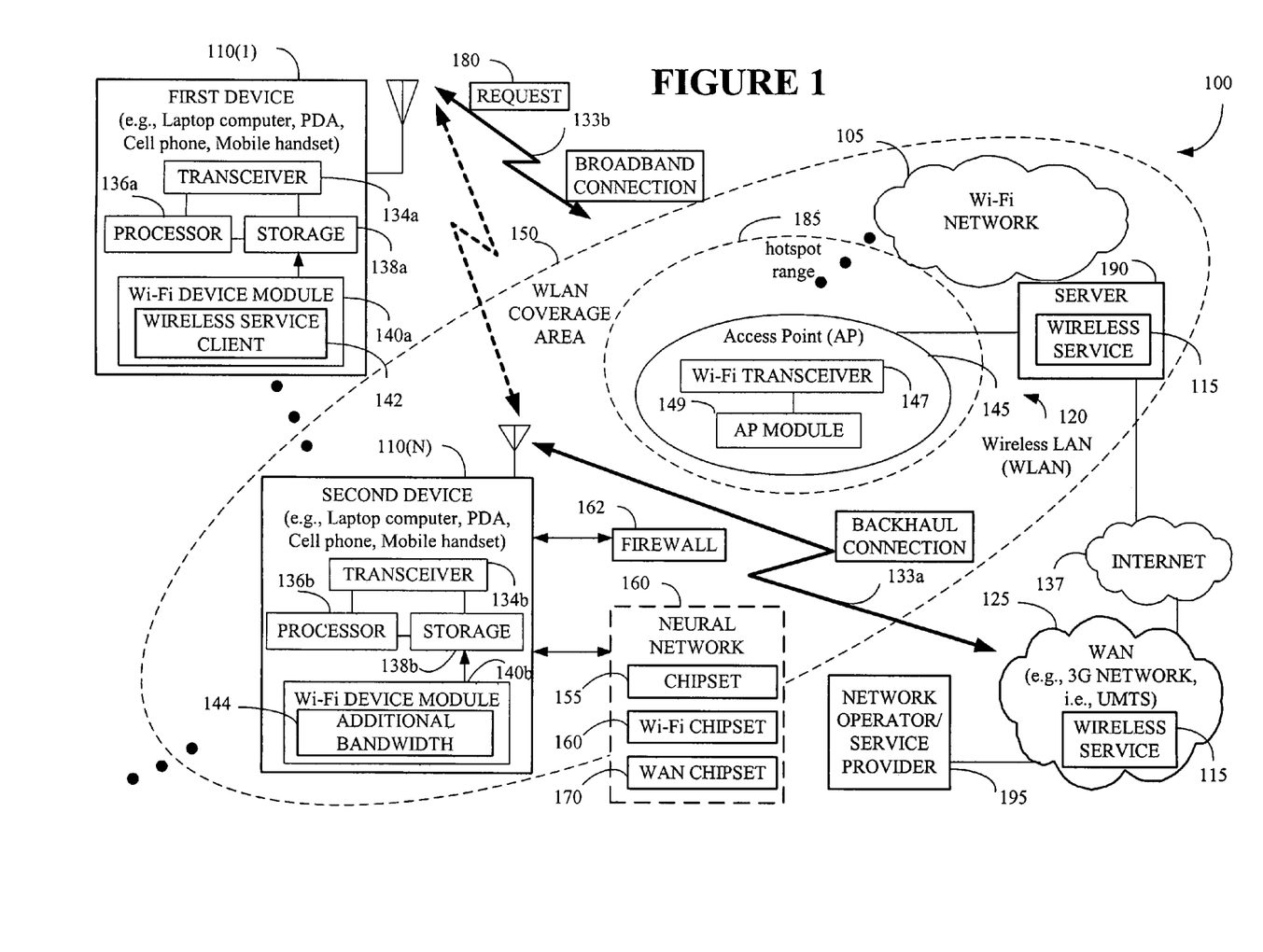
FIG. 1 schematically depicts a block diagram of a communication system that enables desired wireless connectivity in a wireless network, such as a Wi-Fi network for providing mobile communications to a user in accordance with one embodiment of the present invention.

Referring to FIG. 1, a communication system 100 is schematically illustrated to enable desired wireless connectivity in a wireless network, such as a Wi-Fi network 105 for providing mobile communications to a user according to one embodiment of the present invention. For example, the user of a first wireless communication-enabled device 110(1) may obtain access to a wireless service 115 via another user's connection. Such wireless connectivity may be provided through a second wireless communication-enabled device 110(N) that may be located within a coverage area of the Wi-Fi network 105 associated with a high frequency wireless LAN (WLAN) 120, e.g., operating at a radio frequency (RF) of 2.4 Giga Hertz (GHz).

According to one embodiment, to enable use of the wireless service 115 for the user who is unable to connect to the Wi-Fi network 105, the first wireless communication-enabled device 110(1) may communicate over a different network, i.e., a wireless network capable of communicating mobile data, such as a wide area network (WAN) 125. In this way, the user at the first wireless communication-enabled device 110(1) may gain access to the wireless service 115 via a backhaul connection 133a of another user through the second wireless communication-enabled device 110(N) instead of a broadband connection 133b form the first wireless communication-enabled device 110(1) to the Wi-Fi network 105.

While the backhaul connection 133a may be based on an available backhaul bandwidth of the WAN 125 that communicates mobile data for the second wireless communication-enabled device 110(N), the broadband connection 133b may refer to a connection that uses unregulated spectrum for establishing mobile communications between the first wireless communication-enabled device 110(1) and the Wi-Fi network 105. Over the backhaul connection 133a, signaling messages may be exchanged between the second wireless communication-enabled device 110(N) and the wide area network (WAN) 125.

Using the backhaul connection 133a to the WAN 125 or the broadband connection 133b to the high frequency WLAN 120, respectively, the user may communicate relatively high-speed multimedia information including voice, data, and video content associated with the wireless service 115. Examples of the wireless service 115 include e-mail access, communication via instant messaging (IM), Internet browsing, and the like.

In one embodiment, the first wireless communication-enabled device 110(1) may comprise a conventional controller 134a and a conventional storage 136a to store a Wi-Fi device module 138a. The Wi-Fi device module 138a may comprise a wireless service client 142, in one embodiment. The Wi-Fi device module 138a may comprise instructions, such as a software program or a firmware that the controller 134a may execute for the wireless service client 142, which provides the wireless service 115 to the user at the first wireless communication-enabled device 110(1).

Likewise, the second wireless communication-enabled device 110(N) may comprise a conventional controller 134b and a conventional storage 136b to store a Wi-Fi device module 138b. The Wi-Fi device module 138b may keep track of additional bandwidth 144 available in backhaul at the second wireless communication-enabled device 110(N), in one embodiment. The additional bandwidth 144 may enable use of the wireless service 115 by the user at the first wireless communication-enabled device 110(1) through the second wireless communication-enabled device 110(N). The Wi-Fi device module 138b may comprise instructions, such as a software program or a firmware that the controller 134b may execute for determining availability and use of the additional bandwidth 144. The Wi-Fi device modules 138a, 138b and the wireless service client 142 may be defined at least in part by an Institute of Electrical and Electronics Engineers (IEEE) 802.11x standard, e.g. x=a, b, g etc.

The first and second wireless communication-enabled devices 110(1-N) may take the form of any of a variety of devices, such as mobile terminals or handsets including cellular phones, personal digital assistants (PDAs), laptop computers, digital pagers, wireless cards, and any other device capable of accessing the high frequency WLAN 120 and the WAN 125. The WAN 125 may comprise one or more data networks including a public telephone system (PSTN) that may communicate with other networks, such an Internet Protocol (IP) network comprising the Internet 137.

The high frequency WLAN 120 may comprise one or more Wi-Fi networks including the Wi-Fi network 105. The high frequency WLAN 120 may include a multiplicity of access points that supports the Wi-Fi network 105. For example, an access point (AP) 145 may be associated with the Wi-Fi network 105 to provide access to data networks, such as the Internet 137. Consistent with one embodiment, the access point 145 may comprise a Wi-Fi transceiver 147 and access point (AP) module 149. The communication system 100 may cause the AP module 149 at the access point 145 to communicate with the Wi-Fi device modules 138a, 138b and the wireless service client 142.

Consistent with one embodiment of the instant application, the access point 145 may support the provisioning of multiple virtual networks, identified by a service set identifier (SSID), which is a unique label that distinguishes one WLAN from another. Each SSID may be broadcast. The first and second wireless communication-enabled devices 110(1-N) may use the SSID to establish and maintain wireless connectivity. As part of the association process, a wireless communication-enabled device 110 should have the same SSID as the access point 145. A SSID may contain up to 32 alphanumeric characters, which are usually case sensitive. A broadcast SSID may allow each wireless communication-enabled device 110 to detect and identify that network.

The Wi-Fi network 105 may be based on a wireless network protocol that uses unregulated spectrum for establishing a wireless connection. The WAN 125 may use base stations for establishing a communication link with the wireless communication-enabled device 110, such as for cellular WANs, for example.

Examples of the WAN 125 include a Third Generation (3G) network based on a Universal Mobile Telecommunication System (UMTS) protocol, although it should be understood that the present invention may be applicable to other systems or protocols that support multi-media, data, optical, and/or voice communication. For instance, protocols like Code Domain Multiple Access (CDMA) and General Packet Radio Service (GPRS) for GSM networks may be used. That is, it should be understood, however, that the configuration of the communication system 100 of FIG. 1 is exemplary in nature, and that fewer or additional components may be employed in other embodiments of the communication system 100 without departing from the spirit and scope of the instant invention.

In operation, to provide the wireless service 115 to an authorized user, the first wireless communication-enabled device 110(1) may communicate with the Wi-Fi network 105. That is, to determine whether wireless connectivity is available to a first user, i.e., in the broadband connection 133b, the first processor-based, wireless communication-enabled device 110(1) may communicate with the access point 145 associated with the high frequency WLAN 120 that offers the wireless service over the Wi-Fi network 105. Absent such wireless connectivity, the additional bandwidth 144 available at the second processor-based, wireless communication-enabled device 110(N) may be used for the backhaul connection 133a within a coverage area 150 of the high frequency WLAN 120 to connect the first user at the first processor-based, wireless communication-enabled device 110(1) over another network that offers the wireless service 115, e.g., the WAN 125, such as a 3G mobile communication network.

In the communication system 100, to provide access to the wireless service 115 over the WAN 125, the second wireless communication-enabled device 110(N) may comprise a chipset 155 to form a neural network 160. The neural network 160 may bridge communication data from a user of the WAN 125, such as a 3G mobile communication network user to a user of the Wi-Fi network 105, such as an IEEE 802.11x standard compliant network user. The second wireless communication-enabled device 110(N) may further comprise a firewall 162 associated with the neural network 160 to protect data associated with at least one of the user(s) at the first and second wireless communication-enabled devices 110(N). The firewall 162 may protect the users from data crimes.

By combining the firewall 162 with bridging of communication data by the neural network 160, a user at the second wireless communication-enabled device 110(N) may select to share a portion (e.g., 150 kbps) of their 3G backhaul (e.g., 368 kbps) with the IEEE 802.11x users within 100 meters. The user at the second wireless communication-enabled device 110(N) may become a reseller for the additional backhaul bandwidth. In this manner, the user at the second wireless communication-enabled device 110(N) may obtain a subsidized mobile data connection.

The neural network 160 may further comprise a Wi-Fi chipset 165 and a wide area network (WAN) chipset 170 for mobile data communication, e.g., a 3G mobile data chipset. In this way, by using the chipset 155, the neural network 160 may be formed for the high frequency WLAN 120. The chipset 155 may use the neural network 160 to enable wireless connectivity for the user at the first wireless communication-enabled device 110(1) using the second wireless communication-enabled device 110(N).

In response to a request 180 for the wireless service 115 from a first user, the neural network 160 causes sharing of a predefined percentage of additional bandwidth on the backhaul connection 133a across a plurality of mobile users outside a range of a hotspot 185 in which the access point 145 provides the wireless service 115 to the plurality of mobile users through a high speed WLAN or the high frequency WLAN 120. In one embodiment, the hotspot 185 may be a public Wi-Fi hotspot that refers to a single point within a cell or a sector where a relatively large number of users of a multiplicity of wireless communication devices may gather in a relatively small area, for example, an audience gathered in an auditorium or a cafe.

However, broadband IEEE 802.11 standard based hotspots associated with the multiplicity of access points that supports the Wi-Fi network 105 may be few in numbers, and far between, providing coverage in a relatively small area. That is, users of a Wi-Fi enabled device, such as a user of a Wi-Fi enabled laptop computer capable of communicating over the Wi-Fi network 105 based on the IEEE 802.11 standard may not be within range of a Wi-Fi public hotspot or a private wireless access point configured at home. By selectively using the Wi-Fi chipset 165 based on whether the first wireless communication-enabled device 110(1) connects a user to the Wi-Fi network 105 that offers the wireless service 115 on the broadband connection 133b, in combination with the WAN chipset 170 of the second wireless communication-enabled device 110(N), the chipset 155 provides a desired wireless connectivity otherwise unavailable to the user at the first wireless communication-enabled device 110(1).

The first and second wireless communication-enabled devices 110(1-N) may be a fixed location or a mobile device and incorporate wireless protocols, such as IEEE 802.11, IEEE 802.11a, IEEE 802.11b, Bluetooth, or the like for communicating with a network, such as the high frequency WLAN 120 and the WAN 125. The first and second wireless communication-enabled devices 110(1-N) may be in data communication with a server 190 that provides the wireless service 115 through the access point 145.

For example, the access point 145 may communicate with the server 190 over an Ethernet wired network. The transmission and reception of data may use a TCP/IP protocol, and the WAN 125 may be connected to the Internet 137. Each of the first and second wireless communication-enabled devices 110(1-N) may associate with one of the access point(s) 145. The access point 145 may determine which of the communications received over the Ethernet link from the server 190 is destined for a specific wireless communication-enabled device 110 associated with that particular access point.

A user may subscribe to the wireless service 115, such as a Wi-Fi wireless service to become an authorized user of the first wireless communication-enabled device 110(1). That is, the authorized user may receive a subscription from network operator(s)/service provider(s) 195 to use the WAN 125 and/or the high frequency WLAN 120. To this end, the server 190 may cause the WAN 125 to control access to the Wi-Fi network 105 associated with the high frequency WLAN 120 when enabling one or more network operator(s)/service provider(s) 195 to provide the wireless service 115 through the second wireless communication-enabled device 110(N). The server 190 may be adapted to communicate with the Wi-Fi device modules 138a, 138b for an operator among the network operator(s)/service provider(s) 195.

In one embodiment, the Wi-Fi network 105 may generally operate at 2.4 Giga Hertz (GHz) and use a wireless data networking protocol to connect personal computers (PCs) and laptops to a network, essentially enabling wireless communication between a Wi-Fi enabled device and the high frequency WLAN 120 via a radio frequency (RF) link. For example, the first wireless communication-enabled device 110(1) may connect to a wireless access point, e.g., the access point 145 at speeds of up to 11 Megabit per second, or million (1,048,576) of bits per second (Mbps). While the first and second wireless communication-enabled devices 110(1-N) may be based on various industry standards including the IEEE 802.11a and IEEE 802.11g standards, the Wi-Fi network 105 may enable wireless data communication as a Wireless Ethernet that supports several standards, such as IEEE 802.11a/b and g. The Wi-Fi network 105 may provide a high-speed wireless network that provides access to online or Internet content of the Internet 137.

Figure 2:
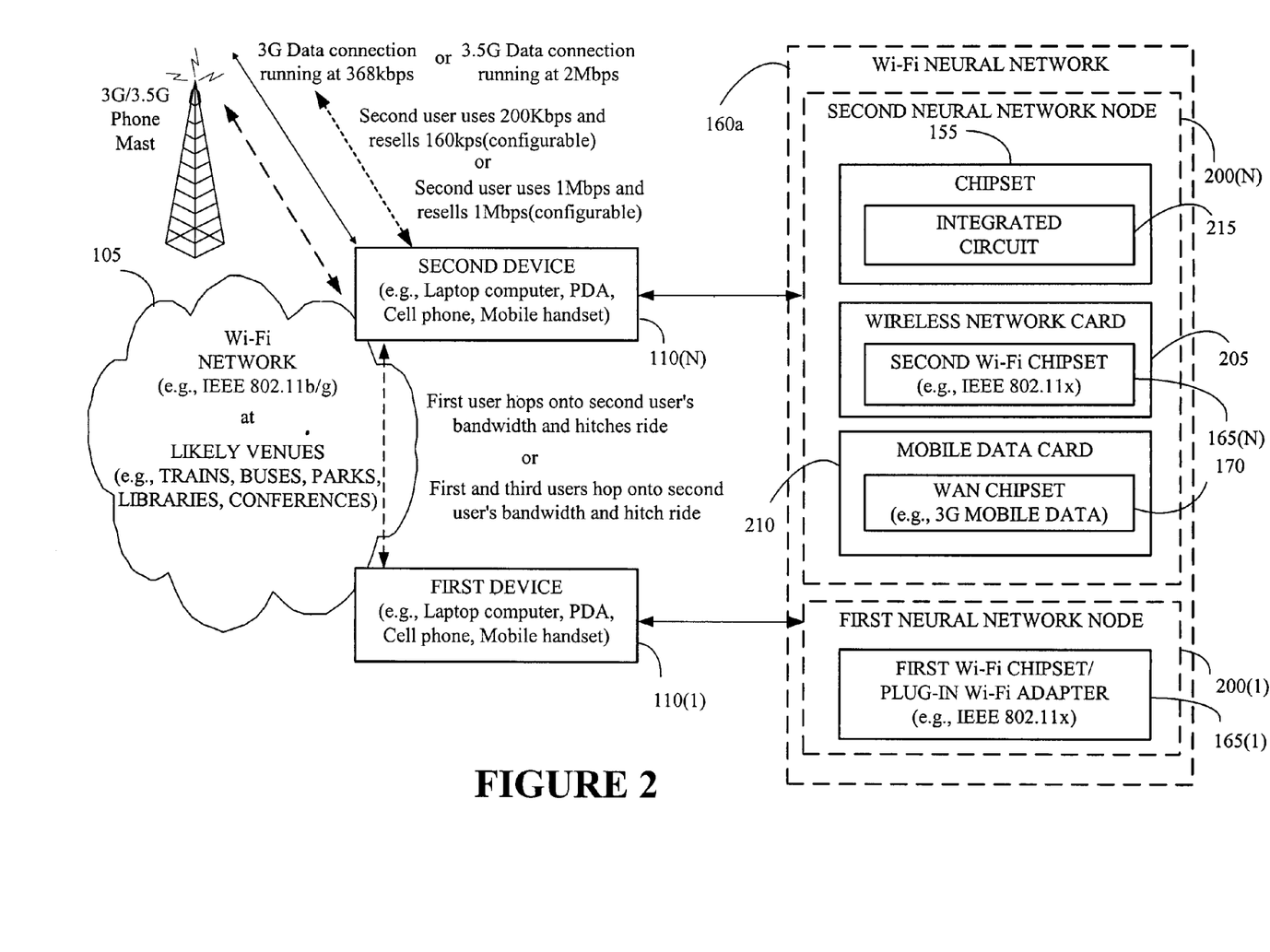
FIG. 2 schematically depicts one embodiment of the neural network shown in FIG. 1, such as a Wi-Fi neural network.

Turning now to FIG. 2, which schematically depicts a Wi-Fi neural network 160a, i.e., one embodiment of the neural network 160 shown in FIG. 1. The Wi-Fi neural network 160a may comprise a first and a second neural network node 200(1-N). The first and second neural network nodes 200(1-N) of the Wi-Fi neural network 160a may coordinate mobile communications associated with the wireless service 115 for a first user of the first processor-based, wireless communication-enabled device 110(1) when the broadband connection 133b is unavailable. Using a connection, i.e., the backhaul connection 133a of a second user through the second processor-based, wireless communication-enabled device 110(N), the first and second neural network nodes 200(1-N) may provide the desired wireless connectivity. In this way, the Wi-Fi neural network 160a may connect the first user to the Internet 137 via the WAN 125 with which the second processor-based, wireless communication-enabled device 110(N) may communicate mobile data over the backhaul connection 133a.

In one embodiment, while the first neural network node 200(1) may be formed at the first processor-based, wireless communication-enabled device 110(1), the second neural network node 200(N) may be formed at the second processor-based, wireless communication-enabled device 110(N). The first neural network node 200(1) may comprise a first Wi-Fi chipset 165(1) in one embodiment. Other embodiments may include a conventional plug-in Wi-Fi adapter at the first neural network node 200(1). Likewise, the second neural network node 200(N) may comprise the chipset 155, a wireless network card 205 and a mobile data card 210. The chipset 155 may comprise an integrated circuit 215, the wireless network card 205 may include the WAN chipset 170, and the mobile data card 210 may incorporate a second Wi-Fi chipset 165(2).

The wireless network card 205 may be capable of connecting the first user at the first processor-based, wireless communication-enabled device 110(1) to the Internet 137 over the broadband connection 133b to the access point 145, such as a public hotspot from the second processor-based, wireless communication-enabled device 110(N). The mobile data card 210 may be coupled to the wireless network card 205 to form the second neural network node 200(N). The mobile data card 210 may be capable of connecting the first user at the first processor-based, wireless communication-enabled device 110(1) to the Internet 137 over the backhaul connection 133a and providing the additional bandwidth 144. While the wireless network card 205 may be defined at least in part by IEEE 802.11x standard, the mobile data card 210 may be defined at least in part by Third Generation mobile communication network standard, in one embodiment.

The Wi-Fi chipset 165(2) may provide the broadband connection 133b to the Wi-Fi network 105 defined at least in part by IEEE 802.11x standard providing backhaul bandwidth defined at least in part by Third Generation mobile communication network standard at the second processor-based, wireless communication-enabled device 110(N) for use within the coverage area 150 of the Wi-Fi network 105 defined at least in part by IEEE 802.11x standard. Instead, the WAN chipset 170 may provide the additional bandwidth 144 for the backhaul connection 133a defined at least in part by Third Generation mobile communication network standard at the second processor-based, wireless communication-enabled device 110(N) for use outside the coverage area 150 of the Wi-Fi network 105 defined at least in part by IEEE 802.11x standard.

Specifically, the chipset 155 may use the integrated circuit 215 to enable mobile communications for the first user at the first processor-based, wireless communication-enabled device 110(1) to gain access to the wireless service 115 via another user's connection through the second processor-based, wireless communication-enabled device 110(N) that may be either located within the coverage area 150 of the Wi-Fi network 105 associated with the high frequency WLAN 120, e.g., operating at a radio frequency (RF) of 2.4 GHz or on the WAN 125 network capable of communicating mobile data, e.g., 3G mobile data.

To provide desired wireless connectivity, the chipset 155 may securely bridge the WAN 125 capable of carrying, e.g., 3G mobile data to the Wi-Fi network 105 while securing data transfer using the firewall 162. Accordingly, using the integrated circuit 215, the chipset 155 disposed at the second processor-based, wireless communication-enabled device 110(N) provides the desired wireless connectivity for the first processor-based, wireless communication-enabled device 110(1). The chipset 155 forms the Wi-Fi neural network 160a for the high frequency WLAN 120 to connect the first user of the wireless service 115 at the first processor-based, wireless communication-enabled device 110(1) to a network different than the high frequency WLAN 120 that offers substantially the same wireless service 115.

The chipset 155 in the Wi-Fi neural network 160a may cause sharing of a predefined percentage of the additional bandwidth 144 on the backhaul connection 133a across a plurality of mobile users outside the range of the hotspot 185 in which the access point 145 provides the wireless service 115 to the plurality of mobile users through the high frequency WLAN 120 in response to the request 180 for the wireless service 115 from the first user at the first processor-based, wireless communication-enabled device 110(1).

In this way, the chipset 155 enables the desired wireless connectivity based on the Wi-Fi neural network 160a for a user of a wireless service at a Wi-Fi enabled device that may be outside the range of the hotspot 185 by connecting the user through another Wi-Fi enabled device either within the coverage area 150 or over a non-requested connection to an alternate mobile communication network, e.g., the WAN 125 capable of carrying, e.g., 3G mobile data and offers the wireless service 115, such as email checking, online access, web browsing, and the like on the Internet 137.

Of course, in other embodiments, the WAN 125 for different than the 3G mobile data, such as a 3.5G protocol based network, and the like may enable 2 megabits per second (Mbps) of data rate instead of 368 Kbps for 3G mobile data into the second processor-based, wireless communication-enabled device 110(N), e.g., a laptop computer or any one of portable, mobile, wireless devices. With availability of such larger bandwidth for a relatively higher data rate, the second user may configure use of 200 Kbps of 3G or 1 Mbps of 3.5G data bandwidth by the second processor-based, wireless communication-enabled device 110(N). The second user may resell the 160 Kbps of 3G or 1 Mbps of 3.5G additional data bandwidth, as two examples, to one or more users, such as to the first user of the wireless service 115 at the first processor-based, wireless communication-enabled device 110(1). In this way, as shown in FIG. 2, the first user may hop onto the second user's bandwidth and hitches ride to provide the wireless service 115 at the first processor-based, wireless communication-enabled device 110(1) through the second processor-based, wireless communication-enabled device 110(N) using the W-Fi neural network 160a. The W-Fi neural network 160a may be used with the Wi-Fi network 105 in many mobile environments including trains, buses, parks, libraries, conference venues, and the like.

In such mobile environments, consistent with one embodiment of the present invention, availability of such larger level of the additional bandwidth 144 in the backhaul connection 133a at the second processor-based, wireless communication-enabled device 110(N) may provide desired wireless connectivity at the first processor-based, wireless communication-enabled device 110(1) comparable to some other wireless communication protocol standards, such as the IEEE 802.16 commercially known as Wi-Max. The Wi-Max protocol is a version of the Wi-Fi protocol that is intended to provide wireless access to the Internet 137 over a wider range of geographic locations, such as across a whole city in high-throughput broadband connections over long distances of up to 30 miles at a maximum speed of 70 Mbps.

Figure 3:
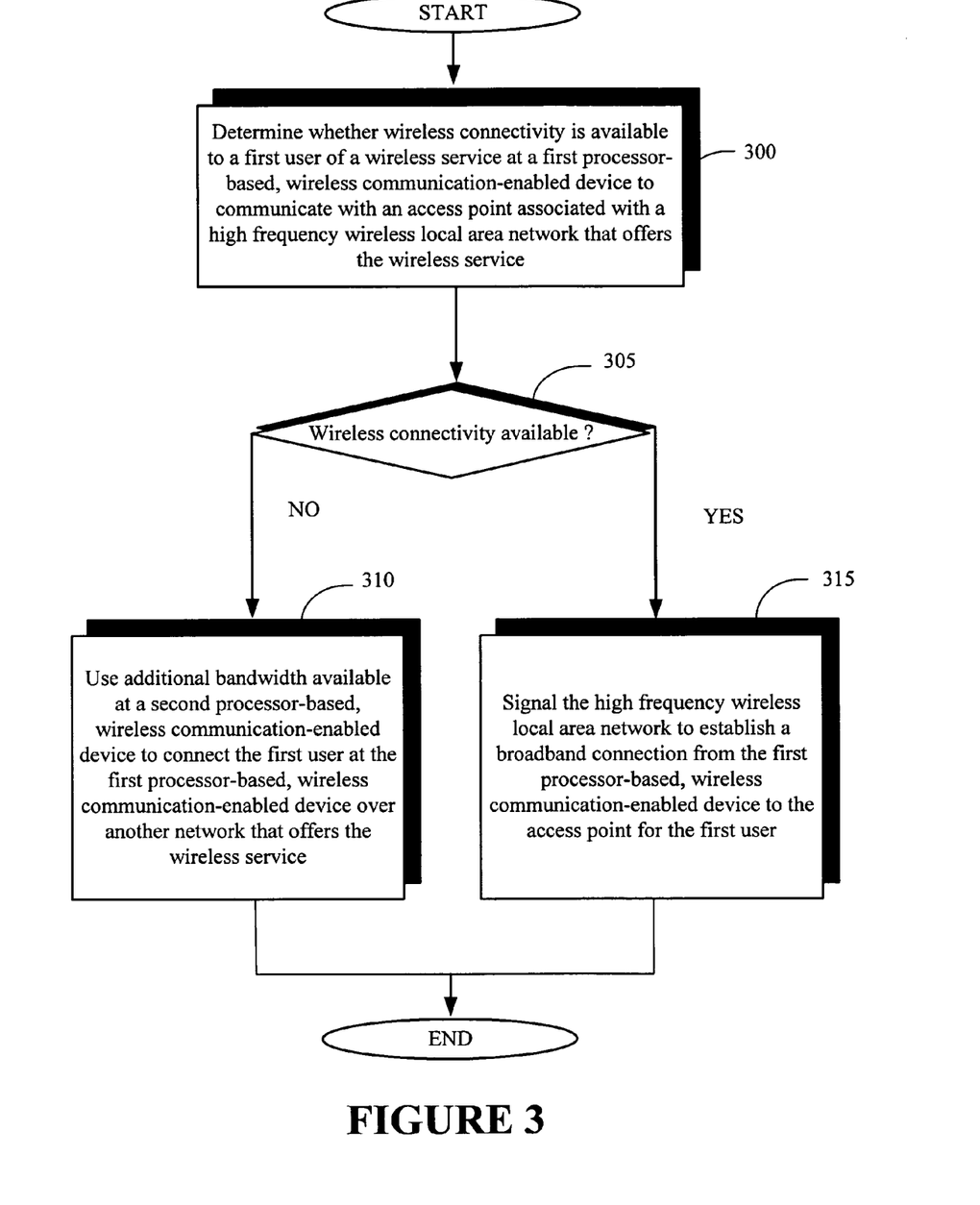
FIG. 3 illustrates a stylized representation of a flow chart implementing a method of enabling desired wireless connectivity in a high frequency wireless local area network for providing mobile communications consistent with one embodiment of the present invention.

Consistent with one embodiment of the present invention, in FIG. 3, a stylized representation of a flow chart implementing a method of enabling desired wireless connectivity in a high frequency wireless local area network for providing mobile communications is illustrated. As indicated in block 300, the Wi-Fi device module 140a at the first processor-based, wireless communication-enabled device 110(1) may determine whether wireless connectivity is available to a first user of the wireless service 115 to communicate with the access point 145 associated with the high frequency WLAN 120 that offers the wireless service 115.

A check at a decision block 305 may ascertain availability of the wireless connectivity from the first processor-based, wireless communication-enabled device 110(1) to the Wi-Fi network 105 for gaining access to the wireless service 115 through the access point 145. If the wireless connectivity is indicated to be unavailable, at the decision block 305, the Wi-Fi device module 140a may use the additional bandwidth 144 available at the second processor-based, wireless communication-enabled device 110(N) to connect the first user at the first processor-based, wireless communication-enabled device 110(1) over another network, e.g., the WAN 125, such as 3G mobile data communication network that offers the wireless service 115, as shown in block 310.

That is, since the first processor-based, wireless communication-enabled device 110(1) is unable to establish the broadband connection 133b, the backhaul connection 133a may be established to transfer mobile data for the first user using the additional bandwidth 144 of the second processor-based, wireless communication-enabled device 110(N) to connect the first processor-based, wireless communication-enabled device 110(1) to the WAN 125 capable of communication the mobile data for offering the wireless service 115 to the first user. Otherwise, when able to connect to the Wi-Fi network 105, the Wi-Fi device module 140a may signal the high frequency WLAN 120 to establish the broadband connection 133b from the first processor-based, wireless communication-enabled device 110(1) to the access point 145 for the first user, as shown in block 315.

Figure 4:
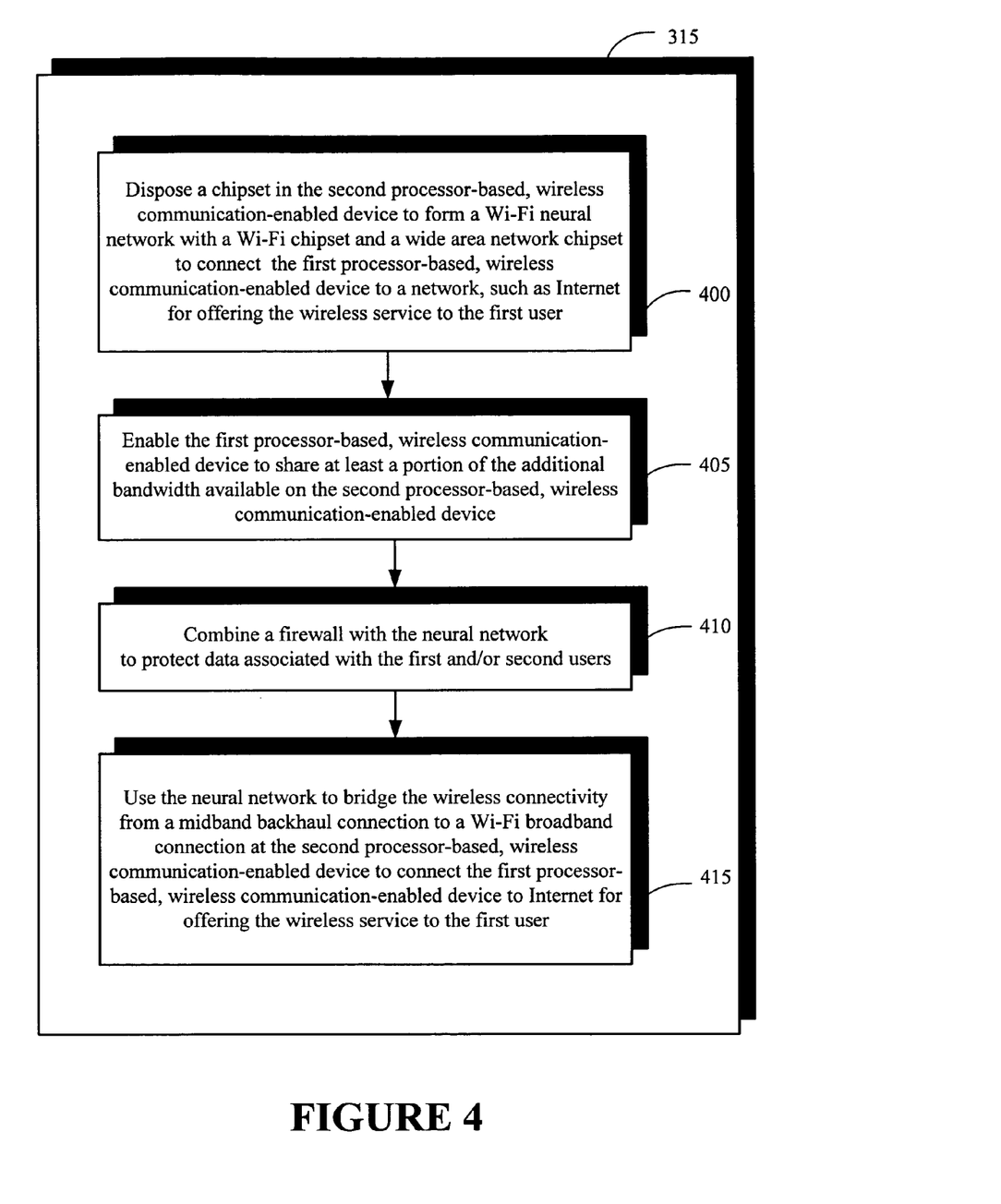
FIG. 4 is a flow diagram illustrating one embodiment of using the chipset disposed in another wireless communication device to form the Wi-Fi neural network shown in FIG. 2 for enabling desired wireless connectivity to a user of a wireless communication device which may otherwise be unable to provide such wireless connectivity.

Referring to FIG. 4, a flow diagram illustrates one embodiment of using the chipset 155 to form the Wi-Fi neural network 160a, as shown in FIG. 2. The Wi-Fi neural network 160a may enable desired wireless connectivity to the first user at the first processor-based, wireless communication-enabled device 110(1) which may otherwise be unable to provide such wireless connectivity on a non-requested connection. At block 400, the chipset 155 may be disposed in the second processor-based, wireless communication-enabled device 110(N) to form the Wi-Fi neural network 160a with the Wi-Fi chipset 165 and the WAN chipset 170 to connect the first user to the Internet 137 for offering the wireless service 115 at the first processor-based, wireless communication-enabled device 110(1). To this end, the first processor-based, wireless communication-enabled device 110(1) may be enabled at block 405 to share at least a portion of the additional bandwidth 144 available on the second processor-based, wireless communication-enabled device 110(N).

For the purposes of offering the wireless service 115 to the first user, at block 410, the Wi-Fi neural network 160a may bridge the wireless connectivity from a midband backhaul connection to a Wi-Fi broadband connection at the second processor-based, wireless communication-enabled device 110(N). As a result, use of the Wi-Fi neural network 160a may connect the first processor-based, wireless communication-enabled device 110(1) to the Internet 137. In one embodiment, use of the firewall 162 may be combined with the Wi-Fi neural network 160a to protect data associated with at least one of the first and second users.

Figure 5:
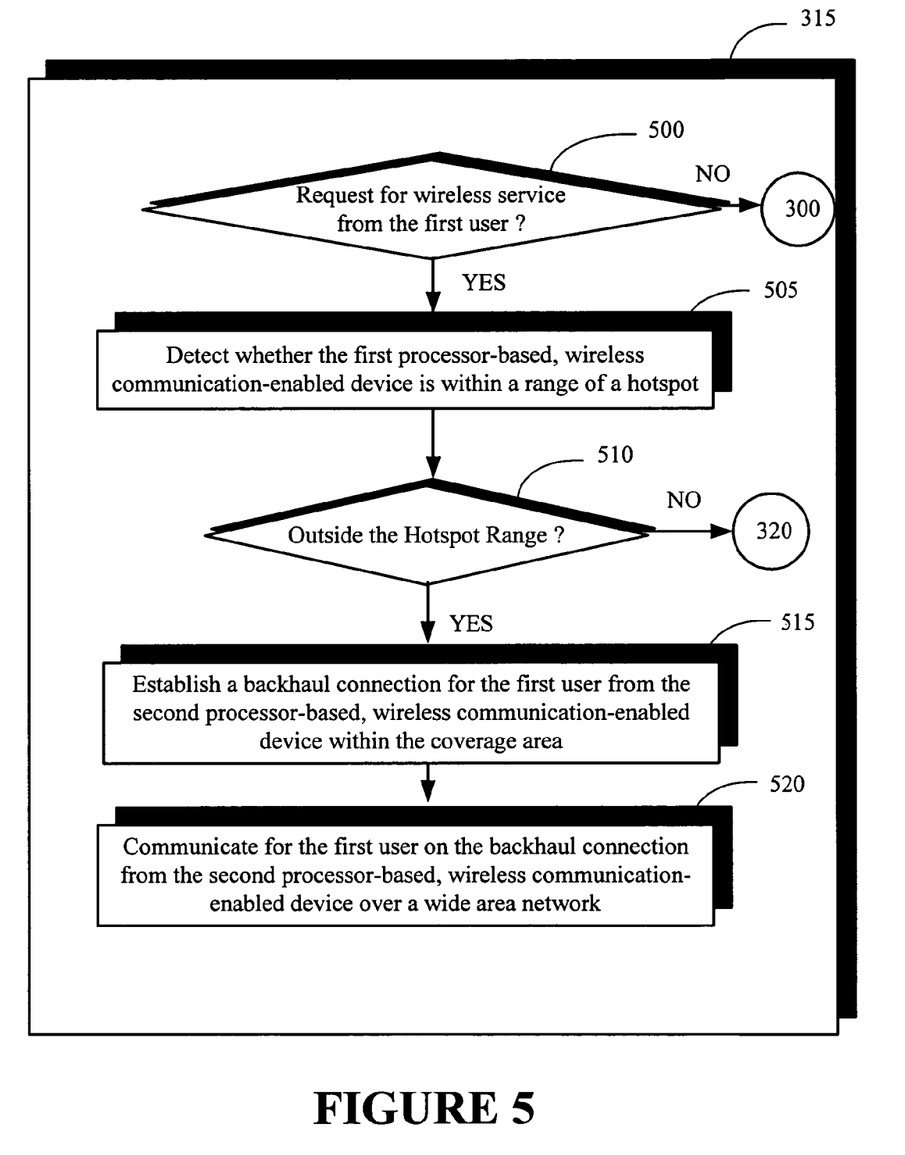
FIG. 5 is a flow diagram illustrating one embodiment of providing desired wireless connectivity to a user of a wireless communication device which may be otherwise unable to connect to the high frequency wireless local area network shown in FIG. 1.

As shown in FIG. 5, a flow diagram depicts an exemplary embodiment of providing desired wireless connectivity to a user of a wireless communication device which may be otherwise unable to connect to the high frequency WLAN 120 shown in FIG. 1. At a decision block 500, the first processor-based, wireless communication-enabled device 110(1) may issue the request 180 associated with the wireless service 115 for the first user. At block 505, the Wi-Fi device module 140a may detect whether the first processor-based, wireless communication-enabled device 110(1) is located within the range of the hotspot 185.

In the case where the first processor-based, wireless communication-enabled device 110(1) is indicated to be located outside the range of the hotspot 185, at a decision block 510, the Wi-Fi device module 140a, by using the Wi-Fi neural network 160a, may establish the backhaul connection 133a for the first user from the second processor-based, wireless communication-enabled device 110(N) within the coverage area 150, as shown in block 515. Accordingly, the Wi-Fi neural network 160a may enable mobile communications for the first user on the backhaul connection 133a from the second processor-based, wireless communication-enabled device 110(N) over the WAN 125.

Figure 6:
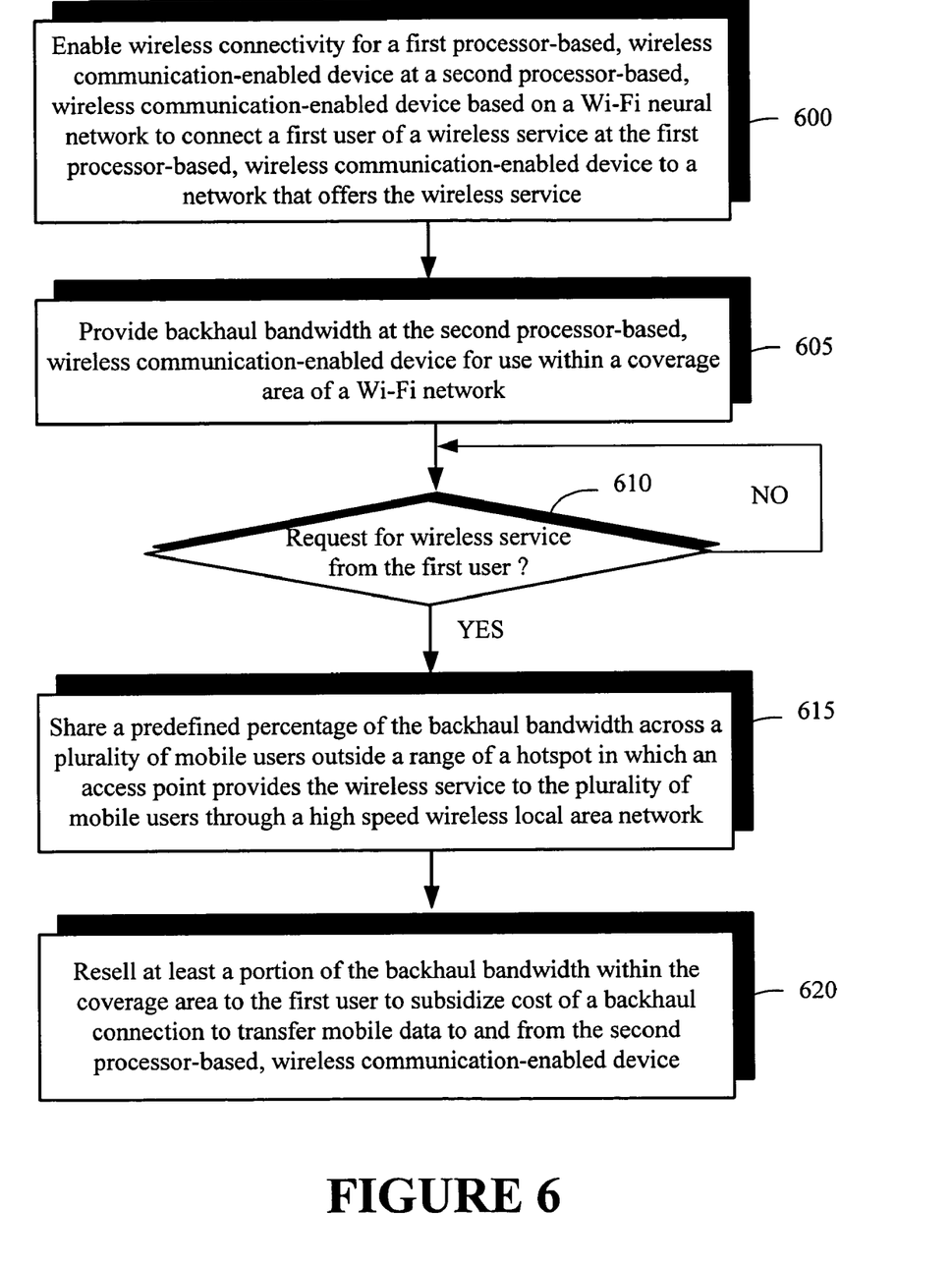
FIG. 6 is a flow diagram illustrating another embodiment of a method for enabling desired wireless connectivity in a high frequency wireless local area network for providing mobile communications.

Finally, FIG. 6 shows a flow diagram that illustrates another embodiment of a method for enabling desired wireless connectivity in the high frequency WLAN 120 for providing mobile communications to the first user at the first processor-based, wireless communication-enabled device 110(1). The Wi-Fi neural network 160a may enable desired wireless connectivity that provides mobile communications on a non-requested connection, i.e., the backhaul connection 133a. Based on the Wi-Fi neural network 160a, wireless connectivity may be enabled for the first processor-based, wireless communication-enabled device 110(1) at the second processor-based, wireless communication-enabled device 110(N) at block 600. Such wireless connectivity may connect a first user of the wireless service 115 at the first processor-based, wireless communication-enabled device 110(1) to either the high frequency WLAN 120 or an alternate network than the high frequency WLAN 120, e.g., the WAN 125 that offers the wireless service 115 and communicates mobile data, such as 3G mobile data.

The WAN 125, at block 605, may provide the backhaul bandwidth 133a defined at least in part by Third Generation (3G) mobile communication network standard at the second processor-based, wireless communication-enabled device 110(N) for use either within or outside the coverage area 150 of the Wi-Fi network 105 defined at least in part by IEEE 802.11x standard. In response to the request 180 for the wireless service 115 from the first user, at a decision block, the Wi-Fi neural network 160a may enable the Wi-Fi device module 140b to share a predefined percentage of the backhaul bandwidth 133a across a plurality of mobile users outside the range of the hotspot 185 in which the access point 145 may provide the wireless service 115 to the plurality of mobile users through a high speed wireless local area network, such as the high frequency WLAN 120, as depicted in block 615. A second user at the second processor-based, wireless communication-enabled device 110(N) may resell at least a portion of the backhaul bandwidth within the coverage area 150 to the first user to subsidize cost of the backhaul connection 133a to transfer mobile data of the second user to and from the second processor-based, wireless communication-enabled device 110(N), at block 620.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of enabling wireless connectivity in a high frequency wireless local area network, the method comprising:
   determining whether wireless connectivity is available to a first user of a wireless service at a first wireless communication-enabled device to communicate with an access point associated with said high frequency wireless local area network that offers said wireless service; and
   if said wireless connectivity is unavailable, using bandwidth available at a second wireless communication-enabled device to connect said first user over another network that offers said wireless service.

2. A method, as set forth in claim 1, further comprising: detecting whether said first wireless communication-enabled device is within a range of a hotspot; and if said first wireless communication-enabled device is outside said range, establishing a backhaul connection for said first user from said second wireless communication-enabled device within a coverage area.

3. A method, as set forth in claim 2, wherein establishing a backhaul connection for said first user further comprising:
enabling said first wireless communication-enabled device to share at least a portion of said bandwidth available on said second wireless communication-enabled device; and
in response to a request associated with said wireless service from said first user at said first wireless communication-enabled device, communicating for said first user on said backhaul connection from said second wireless communication-enabled device over a wide area network.

4. A method, as set forth in claim 3, wherein enabling said first user of said first wireless communication-enabled device to share at least a portion of said bandwidth further comprising:
disposing a chipset in said second wireless communication-enabled device to form a Wi-Fi neural network with a Wi-Fi chipset and a wide area network chipset to connect said first user to Internet for offering said wireless service.

5. A method, as set forth in claim 3, wherein communicating for said first user on said backhaul connection further comprising:
providing an option to said second user of said second wireless communication-enabled device for selectively sharing said at least portion of said bandwidth with said first user of said first wireless communication-enabled device.

6. A method, as set forth in claim 1, further comprising:
signaling said high frequency wireless local area network to establish a broadband connection from said first wireless communication-enabled device to said access point for said first user; and
if said first wireless communication-enabled device is unable to establish said broadband connection, establishing a backhaul connection to transfer mobile data for said first user using said bandwidth of said second wireless communication-enabled device to connect said first wireless communication-enabled device to a wide area network capable of communication said mobile data for offering said wireless service to said first user.

7. A method, as set forth in claim 1, wherein using bandwidth available at a second wireless communication-enabled device further comprising:
using a neural network to bridge said wireless connectivity from a midband backhaul connection to a Wi-Fi broadband connection at said second wireless communication-enabled device to connect said first wireless communication-enabled device to Internet for offering said wireless service to said first user; and
combining a firewall with said neural network to protect data associated with at least one of said first and second users.

8. A method of enabling desired wireless connectivity that provides mobile communications on a non-requested connection, the method comprising:
enabling wireless connectivity for a first wireless communication-enabled device at a second wireless communication-enabled device based on a Wi-Fi neural network to connect a first user of a wireless service at said first wireless communication-enabled device to a network that offers said wireless service.

9. A method, as set forth in claim 8, further comprising:
providing backhaul bandwidth defined at least in part by Third Generation mobile communication network standard at said second processor-based, wireless communication-enabled device for use within a coverage area of a Wi-Fi network defined at least in part by IEEE 802.11x standard; and
in response to a request for said wireless service from said first user, sharing a predefined percentage of said backhaul bandwidth across a plurality of mobile users outside a range of a hotspot in which an access point provides said wireless service to said plurality of mobile users through a high speed wireless local area network.

10. A method, as set forth in claim 9, further comprising:
reselling at least a portion of said backhaul bandwidth within said coverage area to said first user to subsidize cost of a backhaul connection to transfer mobile data to and from said second wireless communication-enabled device.

11. A chipset to enable desired wireless connectivity in a high frequency wireless local area network for providing mobile communications, said chipset comprising:
an integrated circuit that provides wireless connectivity for a first processor-based, wireless communication-enabled device, wherein said chipset is disposed at a second processor-based, wireless communication-enabled device to form a neural network for said high frequency wireless local area network to connect a first user of a wireless service at said first processor-based, wireless communication-enabled device to a network different than said high frequency wireless local area network that offers said wireless service.

12. A chipset, as set forth in claim 11, wherein said neural network comprises a Wi-Fi chipset and a wide area network chipset.

13. A chipset, as set forth in claim 12, wherein said Wi-Fi chipset provides a broadband connection to a Wi-Fi network defined at least in part by IEEE 802.11x standard providing backhaul bandwidth defined at least in part by Third Generation mobile communication network standard at said second processor-based, wireless communication-enabled device for use within a coverage area of a Wi-Fi network defined at least in part by IEEE 802.11x standard.

14. A chipset, as set forth in claim 13, wherein said wide area network chipset provides additional bandwidth for a backhaul connection defined at least in part by Third Generation mobile communication network standard at said second processor-based, wireless communication-enabled device for use within a coverage area of a Wi-Fi network defined at least in part by IEEE 802.11x standard.

15. A chipset, as set forth in claim 14, wherein said chipset based on said neural network causes sharing of a predefined percentage of said additional bandwidth on said backhaul connection across a plurality of mobile users outside a range of a hotspot in which an access point provides said wireless service to said plurality of mobile users through said high frequency wireless local area network in response to a request for said wireless service from said first user.

16. A communication system to enable desired wireless connectivity in a high frequency wireless local area network for providing mobile communications, said communication system comprising:
a processor-based, wireless communication-enabled device including a chipset that provides wireless connectivity for another processor-based, wireless communication-enabled device, wherein said chipset to form a neural network for said high frequency wireless local area network to connect a user of a wireless service at said another processor-based, wireless communication-enabled device to a network different than said high frequency wireless local area network that offers said wireless service.

17. A communication system, as set forth in claim 16, wherein said processor-based, wireless communication-enabled device further comprising:
   a wireless network card capable of connecting another user at said processor-based, wireless communication-enabled device to Internet over a broadband connection from a public hotspot;
   a mobile data card coupled to said wireless network card to provide said neural network, wherein said mobile data card capable of connecting said user at said another processor-based, wireless communication-enabled device to said Internet over a backhaul connection and providing additional bandwidth, said chipset to cause sharing of a predefined percentage of said additional bandwidth across a plurality of mobile users outside a range of said public hotspot in which an access point provides said wireless service to said plurality of mobile users through said high frequency wireless local area network in response to a request for said wireless service from said user; and
   a firewall associated with said neural network to protect data associated with at least one of said another user and said user at said another processor-based, wireless communication-enabled device, wherein said wireless network card at said processor-based, wireless communication-enabled device and said mobile data card to form a first node of said neural network and another wireless network card at said another processor-based, wireless communication-enabled device to form a second node of said neural network such that said first and second nodes of said neural network to coordinate mobile communications associated with said wireless service for said user of said another processor-based, wireless communication-enabled device using a connection of said another user through said processor-based, wireless communication-enabled device to said Internet.

18. A communication system, as set forth in claim 17, wherein said mobile data card defined at least in part by Third Generation mobile communication network standard, said additional bandwidth available for use within a coverage area of a Wi-Fi network defined at least in part by IEEE 802.11x standard.

19. An apparatus to enable wireless connectivity in a high frequency wireless local area network, the apparatus comprising:
   means for determining whether wireless connectivity is available to a first user of a wireless service at a first wireless communication-enabled device to communicate with an access point associated with said high frequency wireless local area network that offers said wireless service; and
   means for using bandwidth available at a second wireless communication-enabled device to connect said first user over another network different than said high frequency wireless local area network that offers said wireless service if said wireless connectivity is unavailable.

20. An apparatus for enabling desired wireless connectivity provides mobile communications on a non-requested connection, the apparatus comprising:
   means for enabling wireless connectivity for a first wireless communication-enabled device at a second wireless communication-enabled device based on a Wi-Fi neural network; and
   means for connecting a first user of a wireless service at said first wireless communication-enabled device from said second wireless communication-enabled device to a network that offers said wireless service.

* * * * *